(12) United States Patent
Jung

(10) Patent No.: US 8,494,158 B2
(45) Date of Patent: Jul. 23, 2013

(54) METHOD OF DOWNLOADING SOFTWARE IN DIGITAL BROADCAST RECEIVER

(75) Inventor: Dae Young Jung, Seoul (KR)

(73) Assignee: LG Electronics Inc., Seoul (KR)

( * ) Notice: Subject to any disclaimer, the term of this patent is extended or adjusted under 35 U.S.C. 154(b) by 1384 days.

(21) Appl. No.: 11/455,096

(22) Filed: Jun. 19, 2006

(65) Prior Publication Data

US 2006/0285690 A1 Dec. 21, 2006

(30) Foreign Application Priority Data

Jun. 20, 2005 (KR) ........................ 10-2005-0053240

(51) Int. Cl.
*H04N 7/167* (2011.01)
(52) U.S. Cl.
USPC .......................................................... 380/203
(58) Field of Classification Search
USPC .................................. 380/237, 201, 203, 211
See application file for complete search history.

(56) References Cited

U.S. PATENT DOCUMENTS

| 6,005,561 | A  | * | 12/1999 | Hawkins et al. | 715/234 |
| 6,337,715 | B1 | * | 1/2002  | Inagaki et al. | 348/553 |
| 6,532,591 | B1 | * | 3/2003  | Arai et al.    | 725/132 |
| 6,766,528 | B1 | * | 7/2004  | Kim et al.     | 725/113 |
| 6,948,183 | B1 | * | 9/2005  | Peterka        | 725/25  |
| 2004/0068740 | A1 | * | 4/2004 | Fukuda et al.  | 725/45  |
| 2007/0172059 | A1 | * | 7/2007 | Yamaguchi et al. | 380/228 |

FOREIGN PATENT DOCUMENTS

| EP | 926862 A2 | * | 6/1999 |
| KR | 1999-0063497 A | | 7/1999 |
| KR | 10-2001-0038584 A | | 5/2001 |

* cited by examiner

*Primary Examiner* — Samson Lemma
(74) *Attorney, Agent, or Firm* — Birch, Stewart, Kolasch & Birch, LLP

(57) ABSTRACT

Provided is a method of downloading, by a digital broadcast receiver, a software for upgrade through broadcast signals. According to the method, existence of a receiver software to be downloaded is checked, and a reservation time for downloading of the software is set. After that, a download and upgrade of the software are performed at the set reservation time.

10 Claims, 4 Drawing Sheets

METHOD OF DOWNLOADING SOFTWARE IN DIGITAL BROADCAST RECEIVER

BACKGROUND OF THE INVENTION

1. Field of the Invention

The present invention relates to a method of downloading a software of a digital broadcast receiver, and more particularly, to a method of making a software download reservation for an upgrade on a time basis or an electronic program guide (EPG) basis.

2. Description of the Related Art

A digital television receiver is one of representative digital broadcast receivers. When a broadcasting station transmits a software for upgrade through data broadcasting in order to upgrade a software including various applications installed in a digital television receiver, the digital television receiver downloads the software for upgrade transmitted from the broadcasting station to upgrade the corresponding application.

That is, the digital television receiver stores a software that controls an operation of the digital television receiver in a storage device (e.g., a flash memory) included in the inside of the digital television receiver, and controls an overall operation of the digital television receiver using this software. This software is transmitted as a data stream through broadcasting waves, so that the digital television receiver receives this software and updates an operation or an application currently in use.

For example, for upgrading of a software stored in a flash memory to improve performance of an arbitrary digital television receiver, a manufacturer of the corresponding digital television receiver manufactures an upgrade version of software to be used for the digital television receiver and transmits this upgrade version software through broadcasting waves to the corresponding digital television receiver to allow the digital television receiver to upgrade the software stored in the flash memory.

FIG. 1 is a flowchart illustrating a general sequence of a software upgrading operation performed in a digital television receiver exemplified as a digital broadcast receiver.

A first operation S1 is an operation of creating, by a software manufacturer, upgrade data, i.e., an upgrade software.

A second operation S2 is an operation of providing the created upgrade software to a broadcasting station.

A third operation S3 is an operation of conveying, by the broadcasting station, data provided from the software manufacturer on a broadcasting stream through broadcasting waves and transmitting the data to a corresponding digital television receiver.

A third operation S4 is an operation of receiving, by the digital television receiver, the broadcasting stream and decoding the received broadcasting stream to install the decoded upgrade data (contained in the received broadcasting stream) in the corresponding digital television receiver.

A fifth operation S5 is an operation of driving the installed software to perform upgrade and displaying an upgrade status of the corresponding software to a user using a progressive bar or an on-screen-display (OSD).

As described above, according to the related art software download/upgrade method, a broadcasting station transmits data provided from a software manufacturer through broadcasting waves, and a corresponding digital television receiver receives/decodes the data to perform software upgrading.

However, when the software upgrading is performed, it takes a considerable time for the digital television receiver to download the software through broadcasting waves and so it is inconvenient. Also, a user should wait until the digital television receiver downloads the software, drives the software, and completes upgrading.

SUMMARY OF THE INVENTION

An object of the present invention is to provide a method of downloading a software of a digital broadcast receiver, capable of minimizing a standby time taken for the digital broadcast receiver to download and drive the software to perform upgrading and minimizing a user's inconvenience when upgrading the software of the digital broadcast receiver through a digital data broadcast stream.

Another object of the present invention is to provide a method of downloading a software of a digital broadcast receiver, allowing a user to perform a software download reservation by making a software download and upgrade reservation on a time basis in advance when upgrading the software of the digital broadcast receiver through a digital data broadcast stream.

A further another object of the present invention is to provide a method of downloading a software of a digital broadcast receiver, allowing a user to perform a software download reservation by making a software download and upgrade reservation on an EPG basis in advance when upgrading the software of the digital broadcast receiver through a digital data broadcast stream.

A still further another object of the present invention to provide a method of downloading a software of a digital broadcast receiver, capable of removing unnecessary standby time taken during a software download/upgrade, imposing no limitation in using the digital television receiver, and minimizing a user's inconvenience by making a software download and upgrade reservation in advance when upgrading the software of the digital broadcast receiver through a digital data broadcast stream.

To achieve these objects and other advantages and in accordance with the purpose of the invention, as embodied and broadly described herein, there is provided a method of downloading a software of a digital broadcast receiver, the method including: (a) checking existence of a receiver software to be downloaded; (b) setting a reservation time for downloading of the software; and (c) performing download and upgrade of the software at the set reservation time.

In another aspect of the present invention, there is provided a method of downloading a software of a digital broadcast receiver, the method including: (a) checking, by the digital broadcast receiver, a software to be downloaded using received and decoded program and system information; (b) selecting a real-time download or a download reservation with respect to the checked software; (c) when the real-time download is selected, performing downloading/upgrading of a corresponding software; (d) when the download reservation is selected, selecting one of a plurality of reservation types and a reservation time; and (e) performing downloading/upgrading at the reservation time according to the selected reservation type.

In a further another aspect of the present invention, there is provided a digital broadcast receiver having a tuner for receiving digital broadcast signals, a demodulator for demodulating broadcast signals from the tuner, a demultiplexer for demultiplexing demodulated signals from the demodulator, a data decoder for receiving program and system information and a program and system information protocol from the demultiplexer to decode the same, a channel manager for receiving channel information from the data decoder to perform a channel-related control, and an application manager for relaying the channel manager to a user interface, the digital broadcast receiver including: a software detector connected to the application manager to check existence of a receiver software to be downloaded; a time setting unit connected to the application manager to set a reservation time for downloading the software; and an executer connected to the application manager to perform a download and an upgrade of the software at the set reservation time.

DETAILED DESCRIPTION OF THE INVENTION

A method of downloading a software of a digital broadcast receiver according to the present invention will now be descried with reference to the accompanying drawings.

Figure 1:
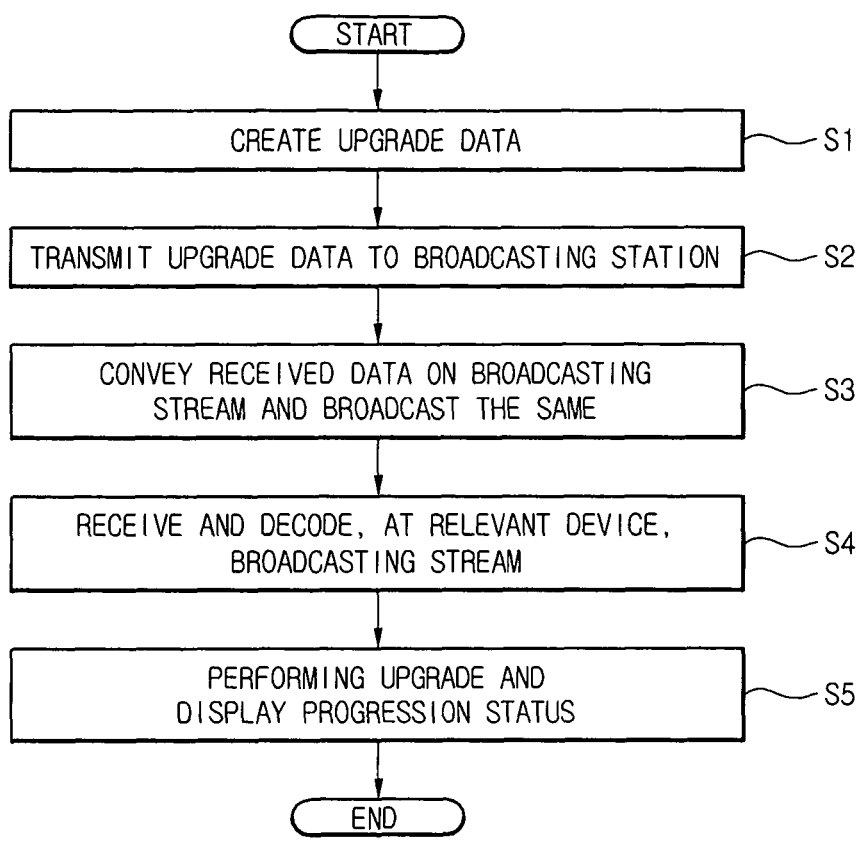
FIG. 1 is a flowchart illustrating a sequence of a software upgrading operation of a digital broadcast receiver.
Figure 2:
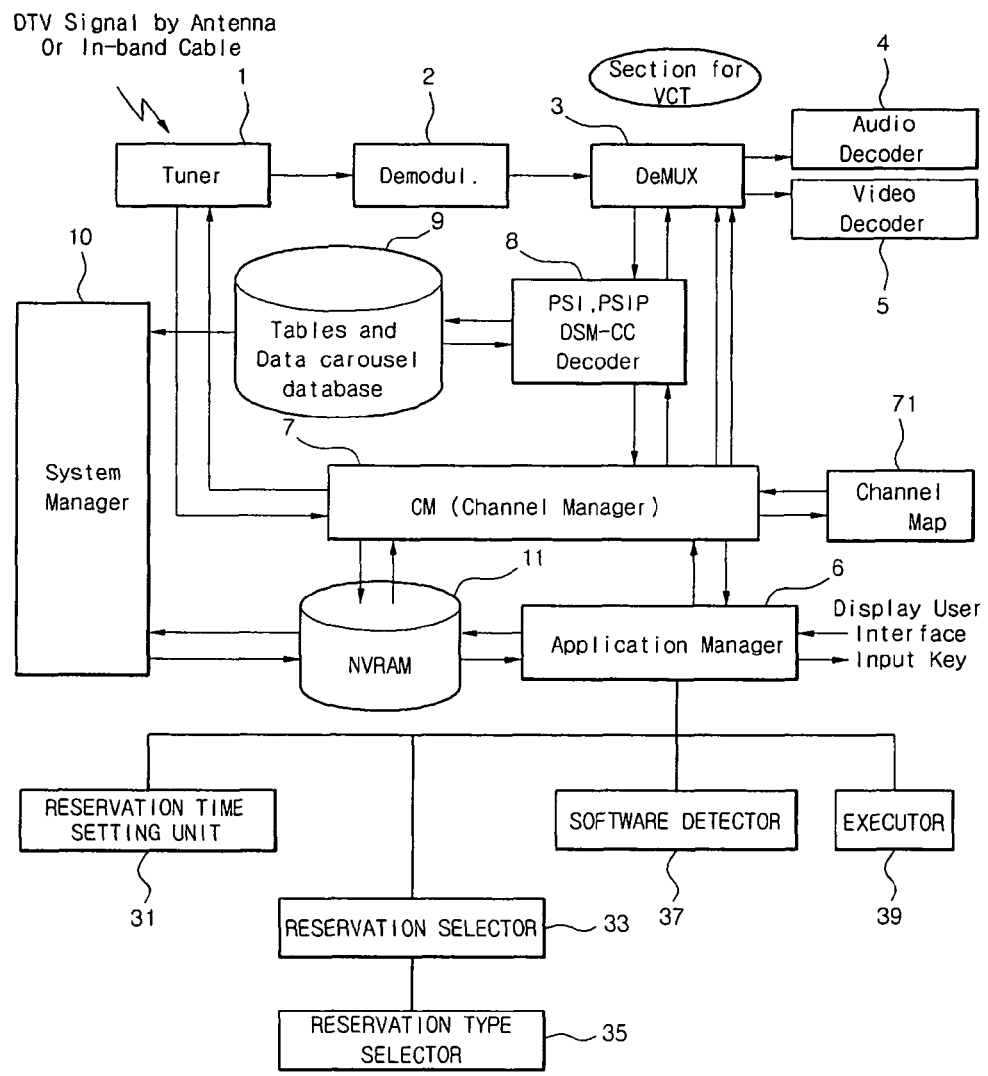
FIG. 2 is a block diagram of a construction of a digital broadcast receiver according to the present invention.

First, FIG. 2 is a block diagram of a construction of a digital broadcast receiver, i.e., a digital television receiver according to the present invention.

The digital television receiver includes: a tuner 1 for receiving digital broadcasting signals, a demodulator 2 for demodulating the received digital broadcasting signals; a demultiplexer 3 for demultiplexing the demodulated digital broadcasting signals; an audio decoder 4 for decoding an audio stream outputted from the demultiplexer 3; a video decoder 5 for decoding a video stream outputted from the demultiplexer 3; an application manager 6 for controlling a display operation and a user's key inputting operation; a channel manager 7 for controlling the tuner, creating a channel map 71, and controlling data decoding, the application manager, audio/video decoding; a data decoder 8 for decoding data stream outputted from the demultiplexer 3; a data base 9 for storing the data decoded by the data decoder 8; a system manager 10 including a device power source and controlling the data base 9 and a software; and a memory device 11 for storing information of the channel manager, the application manager 6, and the system manager 10.

The tuner 1 of the digital television receiver having the above construction receives ground wave broadcast signals, cable broadcast signals, and satellite digital broadcast signals received through an antenna or in-band cable, selects a broadcast channel under control of the channel manager 7, and delivers signal reception-related information, e.g., the received signal strength and a result thereof to the channel manager 7.

The demodulator 2 performs 64 or 256 vestigial side band demodulation to demodulate the broadcast signals selected by the tuner 1. Here, a demodulated broadcast signal-broadcast stream is delivered to the demultiplexer 3.

The demultiplexer 3 demultiplexes a broadcast stream (inputted transport packet) provided from the demultiplexer 2 under control of the channel manager 7, and delivers an audio stream, a video stream, and a data stream to the audio decoder 4, the video decoder 5, and the data decoder 8, respectively. Also, the demultiplexer 3 demultiplexes a PSI table according to a command of a PSI decoder to create a section of the PSI table and transmits the created section to the PSI decoder.

The audio decoder 4 decodes an audio elementary stream outputted from the demultiplexer 3 and outputs the decoded audio elementary stream, and the video decoder 5 decodes a video elementary stream outputted from the demultiplexer 3 and outputs the decoded video elementary stream.

The application manager 6 supports a screen-based graphic user interface of a digital television receiver, recognizes a command by user's key (including a remote controller) manipulation for manipulating a device, and delivers the recognized command to the channel manager 7. That is, the application manager 6 delivers a variety of key commands such as a device setting command and a channel switching command to the channel manager 7, and stores corresponding information in the memory device 11.

Here, elements constituting the subject matter of the present invention will be described as follows.

(1) A reservation selector 33 performs a control operation of controlling the application manager 6 to propose whether to perform a software download in real-time or to make a reservation of a software download, to a user through a graphic user interface.

(2) The reservation selector 33 is connected with a reservation type selector 35, which performs a control operation of controlling the application manager 6 to provide a graphic user interface so that a user may select one of reservation types (here, a time-based reservation and an electronic program guide-based reservation).

(3) A software detector 37 performs a control operation of controlling the application manager 6 to inform a user that there exists a software to be downloaded for an upgrade using a PSI provided from the PSI decoder of the data decoder 8 through a graphic user interface.

A reservation time setting unit 31 performs a control operation of controlling the application manager 6 to inform a system manager 10 of a reservation time and to store the reservation time in a non-volatile random access memory (NVRAM) when a reservation time to be downloaded is set through a graphic user interface.

An execution unit 39 performs a control operation of controlling the system manager 10 to inform the application manager 6 that a software should be downloaded when the reservation time reaches. Also, the execution unit 39 performs a control operation of controlling the application manager 6 to select or check an appropriate channel to download and upgrade the software.

The channel manager 7 controls the tuner 1 to select a channel, creates the channel map 71, resets a PSI decoder of the data decoder 8, and requests channel information. Also, the channel manager 7 sets an audio packet identifier (PID) and a video packet identifier at the demultiplexer 3.

The data decoder 8 includes a program and system information decoder, a PSIP decoder, and a digital storage media command and control (DSM-CC) decoder, and performs decoding related to these decoders.

That is, the data decoder 8 performs PSI decoding, PSIP decoding, and DSM-CC decoding, and serves as a control module. In detail, the data decoder 8 performs an operation of setting a packet identifier for a PSI table and a PSIP table at the demultiplexer 3, an operation of receiving a PSI section to create a PSI database for an MPEG2 system, receiving a PSIP section to create a PSIP database for an ATSC, and receiving a DSM-CC section and a data carousel to create a carousel database for an ATSC.

The system manager 10 controls booting of a device according to a power-on/off, performs a writing operation of the memory device 11, and stores an image of a downloaded software.

The memory device 11, that is a non volatile memory device, stores and outputs various information of the application manager 6, the channel manager 7, and the system manager 10.

Figure 3:
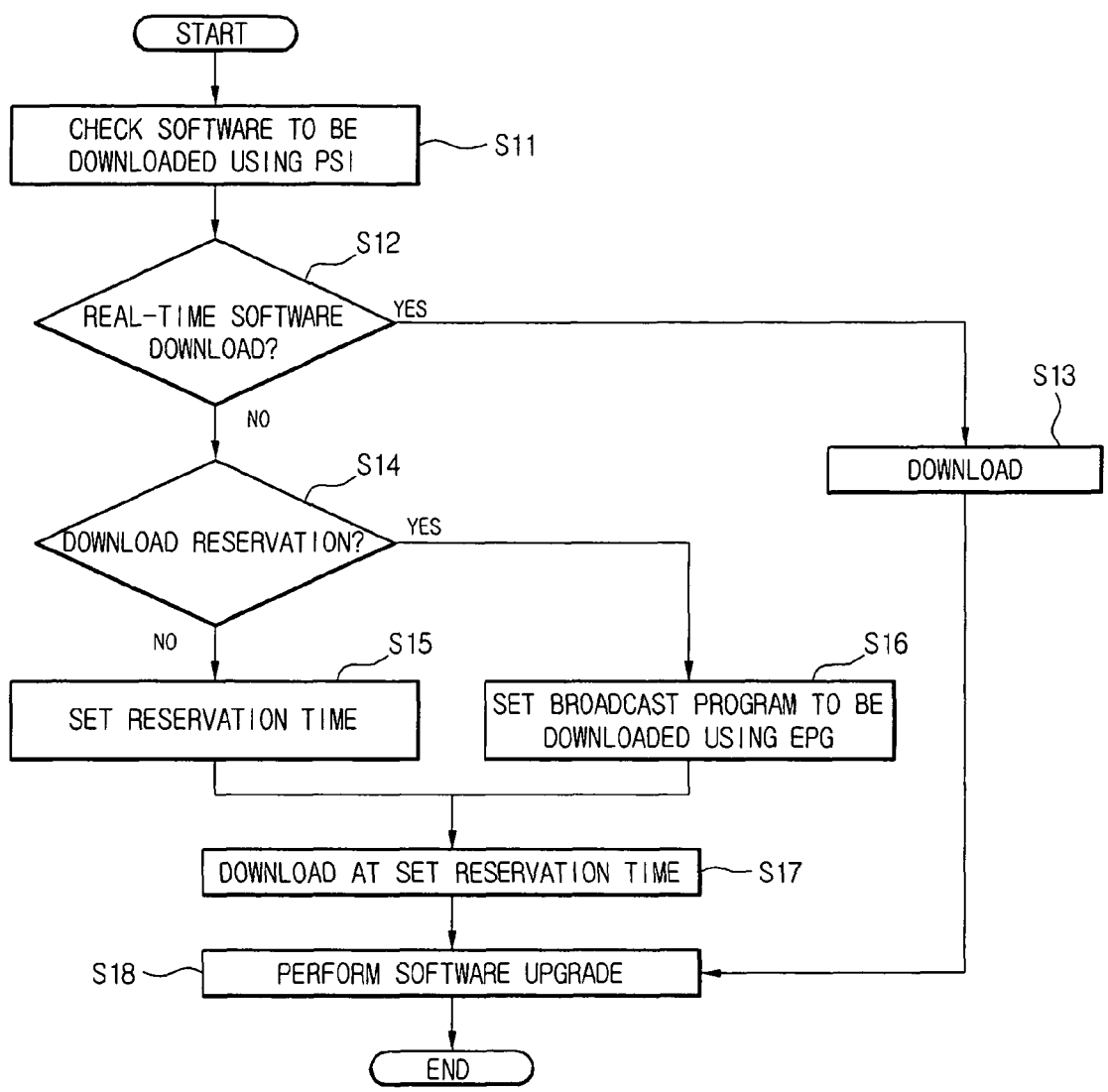
FIG. 3 is a flowchart illustrating a sequence of a software reservation setting and download of a digital broadcast receiver according to the present invention.

FIG. 3 is a flowchart illustrating a method of downloading a software of a digital broadcast receiver according to the present invention.

A first operation S11 is an operation of checking a software to be downloaded using a PSI. That is, in the operation S11, the data decoder 8 detects the software of the digital broadcast receiver transmitted from a broadcasting station. When the software to be downloaded is checked in the operation S11, an operation S12 is performed to allow the application manager 6 to ask a user whether to perform download of a software in real-time through a graphic user interface. The operation S12 may be performed by allowing the application manager 6 to ask a user whether to perform download of a software in real-time or whether to make a download reservation using an on-screen-display through a display device.

When a user selects to download the software in real-time through key manipulation in response to this question, a third operation S13 is performed and a real-time download is performed. After that, an eighth operation S18 is performed to upgrade the downloaded software and an entire operation is ended.

When a user selects to make a software download reservation through key manipulation in the second operation S12, a fourth operation S14 is performed.

That is, a use may desire to download the software later without downloading the software in real-time because he wants to continue to view a current channel without disturbance.

In that case, the fourth operation S14 is performed to allow a user to determine a download reservation type. This question may be made by allowing a user to select the download reservation type using an on-screen-display through the application manager 6. A user selects the download reservation type using a remote controller's key in response to this question.

A user is allowed to select one of a time-based download reservation and an electronic program guide-based download reservation as the download reservation.

When a user selects the time-based download reservation, a fifth operation S15 is performed. On the contrary, when a user selects the electronic program guide-based download reservation, a sixth operation S16 is performed. In the fifth operation S15, a user sets a time setting regarding in what minutes later or what hours later the downloading is to be performed using the remote controller's key. The application manager 6 informs the system manager 10 of a channel and a time for which the software downloading is to be performed using information regarding a download reservation time inputted using the remote controller's key by a user. The information regarding the download reservation time is stored in the memory device 11.

In the operation S16, a user sets a broadcasting program to be downloaded through an electronic program guide using the remote controller's key. That is, the application manager 6 outputs an electronic program guide on-screen-display to an image display device, and a user is allowed to select a broadcasting program of a relevant channel from the electronic program guide and to make a software download reservation. The application manager 6 informs the system manager 10 of a channel for which the software downloading is to be performed and a start time of a broadcasting program. Information regarding the channel for which the software downloading is to be performed and the start time of the broadcasting program is also stored in the memory device 11.

After that, the system manager 10 checks whether a reservation time reaches in a seventh operation S17. When the reservation time reaches in the seventh operation S17, the system manager 10 informs the application manager 6 that the software should be downloaded and the application manager 6 downloads the software at the set reservation time.

In the eighth operation S18, the software is upgraded using the downloaded software and the entire operation is ended.

Figure 4:
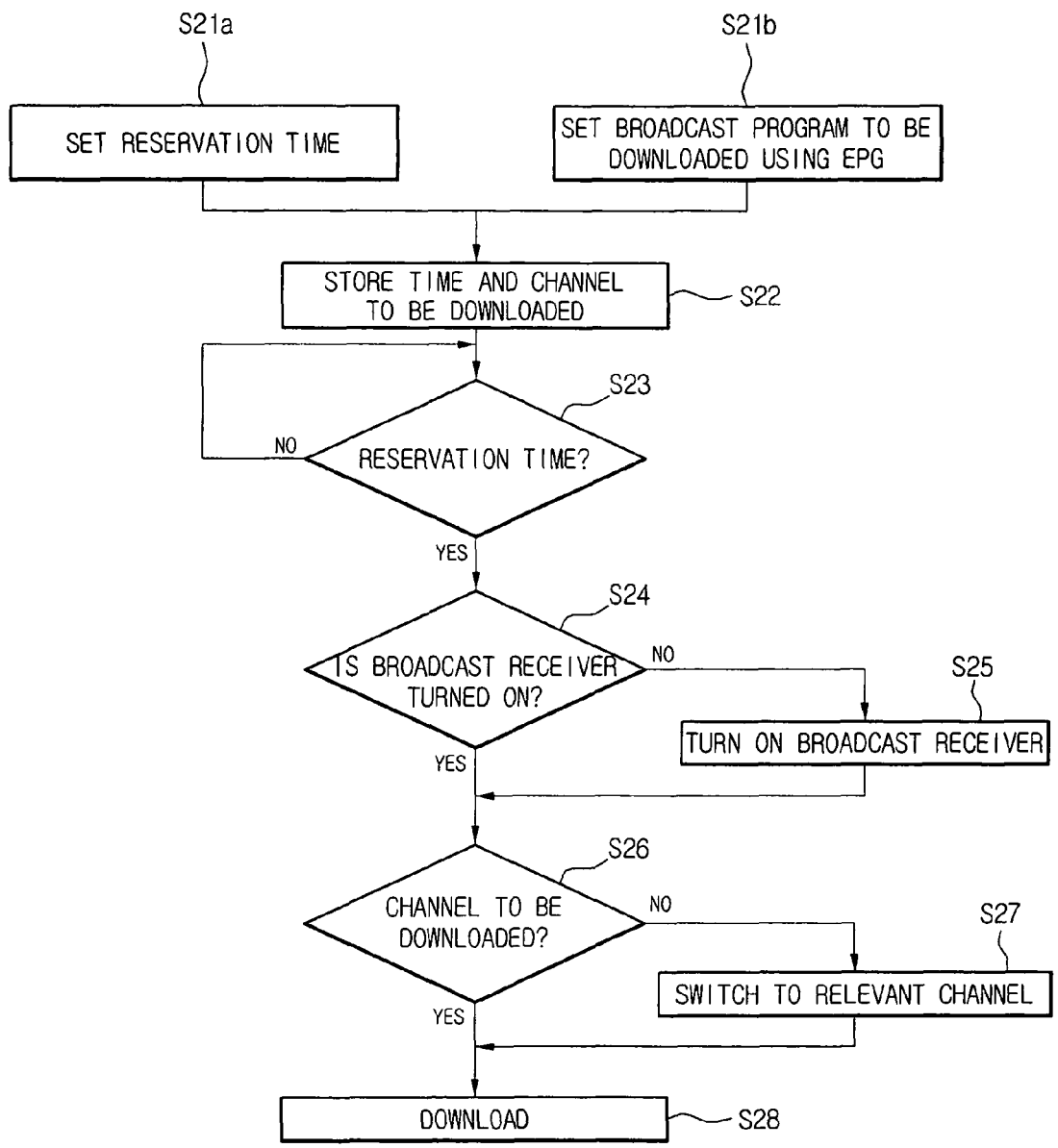
FIG. 4 is a flowchart illustrating a detailed process of a method of downloading a software of a digital broadcast receiver according to the present invention.

FIG. 4 is a flowchart illustrating a detailed process of the above-described download reservation. As described above, whether a user has performed a time setting regarding at which time the downloading is to be performed (S21a) or whether a user has set a broadcast program to be downloaded using an electronic program guide is checked (S21b).

In a next operation S22, the software download reservation time and the channel are stored in the memory device 11 as described above.

After that, the system manager 10 checks whether the download reservation time reaches in a next operation S23. When the download reservation time reaches, a next operation S24 is performed. In the operation S24, whether the power of a digital broadcast receiver is turned on is checked first. When the power of the digital broadcast receiver is turned off, the system manager 10 turns on the digital broadcast receiver through a power control.

In a next operation S26, the system manager 10 informs the application manager 6 that the software should be downloaded, and the application manager 6 checks whether a current channel is a channel to be downloaded. When the current channel is not the channel to be downloaded in the operation S26, the application manager 6 informs the channel manager 7 of information regarding a channel to be downloaded, and the channel manager 7 controls the tuner 1 to select a corresponding channel (S27).

When the current channel is the channel to be downloaded, or switching (selecting) of the channel to be downloaded is completed since the current channel is not the channel to be downloaded, a next operation S28 is performed so that a software download is performed. When the download is completed, upgrade of the relevant software is performed.

The present invention provides a download reservation and upgrade function when the digital broadcast receiver upgrades a receiver's software on the basis of data broadcasting.

Since a download time may be reserved when the digital broadcast receiver's software is upgraded, a user may conveniently download and upgrade the software without being disturbed when a user currently views other broadcast channel/program.

Also, even when the power of the digital television receiver is turned off, the power of the digital television receiver is automatically turned on when the reservation time reaches, and a relevant software is downloaded and upgrading of the software is performed, so that an unnecessary standby time taken for downloading and upgrading the software may be reduced.

Also, since the real-time download or the download reservation may be freely selected depending on a user's choice, downloading may be appropriately performed according to a user's preference or environments. Also, since the download reservation may be made through the electronic program guide, a user may check and reserve the broadcast program, and a separate download device is not required.

What is claimed is:

1. A method of downloading receiver software of a digital broadcast receiver, the method comprising:
    checking, by the digital broadcast receiver, an existence of the receiver software to be downloaded;
    providing, by the digital broadcast receiver, a user interface to allow a user to choose between a time-based reservation mode for downloading of the receiver software and an electronic program guide (EPG) based reservation mode for downloading of the receiver software;
    determining, by the digital broadcast receiver, which reservation mode is chosen among the time-based reservation mode and the EPG based reservation mode;
    if the time-based reservation mode is chosen, setting, by the digital broadcast receiver, a reservation time for downloading of the receiver software based on a specific time inputted by the user;
    if the EPG based reservation mode is chosen, outputting, by the digital broadcast receiver, an EPG and then setting the reservation time for downloading of the receiver software based on a start time of a program selected using the EPG; and
    performing, by the digital broadcast receiver, a download and upgrade of the receiver software at the set reservation time,
    wherein the receiver software is different from the program.

2. The method according to claim 1, wherein the step of performing the download and upgrade of the receiver software comprises:
    automatically selecting, by the digital broadcast receiver, a channel to be downloaded at the set reservation time and performing the download and upgrade of the receiver software.

3. The method according to claim 1, wherein the step of performing the download and upgrade of the receiver software comprises:
    automatically turning on, by the digital broadcast receiver, a power of the digital broadcast receiver when the power of the digital broadcast receiver is turned off at the set reservation time and performing the download and upgrade of the receiver software.

4. The method according to claim 1, wherein the step of checking the existence of the receiver software is performed using program and system information provided from a program and system information decoder.

5. A method of downloading receiver software of a digital broadcast receiver, the method comprising:
    checking, by the digital broadcast receiver, the receiver software to be downloaded using received and decoded program and system information;
    providing, by the digital broadcast receiver, a user interface to allow a user to choose between a time-based reservation mode for downloading of the receiver software and an electronic program guide (EPG) based reservation mode for downloading of the receiver software;
    determining, by the digital broadcast receiver, which reservation mode is chosen among the time-based reservation mode and the EPG based reservation mode;
    if the time-based reservation mode is chosen, setting, by the digital broadcast receiver, a reservation time for downloading of the receiver software based on a specific time inputted by the user;
    if the EPG based reservation mode is chosen, outputting, by the digital broadcast receiver, an EPG and then setting the reservation time for downloading of the receiver software based on a start time of a program selected using the EPG; and
    downloading/upgrading, by the digital broadcast receiver, of the receiver software at the reservation time,
    wherein the receiver software is different from the program.

6. The method according to claim 5, wherein the setting the reservation time for downloading of the receiver software comprises:
    storing, by the digital broadcast receiver, a time and a channel for which the receiver software is to be downloaded in a non-volatile memory; and
    automatically turning on, by the digital broadcast receiver, a power of the digital broadcast receiver when the power of the digital broadcast receiver is turned off at the selected reservation time and automatically switching to the stored channel.

7. A digital broadcast receiver having a tuner for receiving digital broadcast signals, a demodulator for demodulating broadcast signals from the tuner, a demultiplexer for demultiplexing demodulated signals from the demodulator, a data decoder for receiving program and system information and a program and system information protocol from the demultiplexer to decode the program and system information and the program and system information protocol, and a channel manager for receiving channel information from the data decoder to perform a channel-related control, the digital broadcast receiver comprising:
    a microprocessor configured to form an application manager configured to check an existence of receiver software to be downloaded;
        provide a user interface to allow a user to choose between a time-based reservation mode for downloading of the receiver software and an electronic program guide (EPG) based reservation mode for downloading of the receiver software;
        determine which reservation mode is chosen among the time-based reservation mode and the EPG based reservation mode;
        if the time-based reservation mode is chosen, set a reservation time for downloading the receiver software based on a specific time inputted by the user;
        if the EPG based reservation mode is chosen, output an EPG and set the reservation time for downloading of the receiver software based on a start time of a program selected using the EPG; and
        perform a download and upgrade of the receiver software at the set reservation time,
        wherein the receiver software is different from the program.

8. The digital broadcast receiver according to claim 7, wherein the microprocessor automatically selects a channel to be downloaded at the reservation time using channel information provided from the channel manager.

9. The digital broadcast receiver according to claim 7, wherein the microprocessor automatically turns on a power of the digital broadcast receiver when the power of the digital broadcast receiver is turned off at the reservation time.

10. The digital broadcast receiver according to claim 7, wherein the microprocessor checks the existence of the receiver software to be downloaded using program and system information provided from the data decoder.

* * * * *